(12) United States Patent
Carty et al.

(10) Patent No.: US 7,433,342 B2
(45) Date of Patent: Oct. 7, 2008

(54) WIRELESS-AWARE NETWORK SWITCH AND SWITCH ASIC

(75) Inventors: Clark A. Carty, Brunswick, OH (US); James M. Cisar, Wadsworth, OH (US); James A. Amos, North Canton, OH (US); Steven M. Cloud, Stow, OH (US); Robert A. Bowser, Copley, OH (US); Gordon Mackay, Palo Alto, CA (US)

(73) Assignee: Cisco Technology, Inc.

( * ) Notice: Subject to any disclaimer, the term of this patent is extended or adjusted under 35 U.S.C. 154(b) by 789 days.

(21) Appl. No.: 10/635,960

(22) Filed: Aug. 7, 2003

(65) Prior Publication Data

US 2005/0030946 A1   Feb. 10, 2005

(51) Int. Cl.
*H04Q 7/24* (2006.01)
(52) U.S. Cl. .................. 370/338; 370/392; 370/466
(58) Field of Classification Search ............... 370/389, 370/338, 392, 422
See application file for complete search history.

(56) References Cited

U.S. PATENT DOCUMENTS

| 6,108,316 A | 8/2000 | Agrawal et al. | |
|---|---|---|---|
| 6,247,060 B1 * | 6/2001 | Boucher et al. | 709/238 |
| 7,020,439 B2 * | 3/2006 | Sinivaara et al. | 455/41.2 |
| 7,149,213 B1 * | 12/2006 | Rosner et al. | 370/379 |
| 7,283,525 B2 * | 10/2007 | Burgess et al. | 370/392 |
| 2003/0212821 A1 * | 11/2003 | Gillies et al. | 709/238 |

FOREIGN PATENT DOCUMENTS

| EP | 0 749 259 A2 | 12/1996 |
|---|---|---|
| WO | WO-02/089339 A2 | 11/2002 |

OTHER PUBLICATIONS

International Search Report for International Application No. PCT/US2004/025707 filed on Aug. 6, 2004.
Y. Du, et al., "A flat wireless ATM LAN architecture with distributed ATM switching in base stations", Computer Networks 31 (1999), pp. 931-942.

\* cited by examiner

*Primary Examiner*—Seema S. Rao
*Assistant Examiner*—Sai-Ming Chan
(74) *Attorney, Agent, or Firm*—Tucker Ellis & West LLP

(57) ABSTRACT

An application-specific integrated circuit and related network switch are disclosed. The integrated circuit includes switch circuitry for receiving a 802.11 wireless data frame and forwarding it to a predetermined port. Inspection circuitry is provided for inspecting attributes of the data frame. Decision circuitry is provided for instructing the switch circuitry to forward the data frame based on the attributes, both 802.3 wired and 802.11 wireless.

15 Claims, 4 Drawing Sheets

WIRELESS-AWARE NETWORK SWITCH AND SWITCH ASIC

BACKGROUND OF THE INVENTOR

The present disclosure is directed to the field of Wireless Local Area Networks (WLAN's), with particular applicability to switching devices used with wireless access points in a WLAN. In a WLAN, 10 as shown in FIG. 1, a number of clients 12, e.g., laptop computers, etc., include a wireless card 14 for enabling mobile radio communication with an access point (AP) 16. Each AP 16 has a radio card 18 for communicating with mobile clients 12. The AP 16 communicates with mobile clients in accordance with the IEEE 802.11 protocol. The AP 16 can use a single radio card 18a or also a second card 18(b) to allow transmission in the 2.4 GHz band in accordance with the IEEE 802.11(b) and (g) standards, or in the 5 GHz band in accordance with the IEEE 802.11(a) standard. Also, more than 2 radio cards can be added to the AP 16.

The AP 16 is connected to an Ethernet cable 20, which in turn connects to a network switch 22, from which mobile client communications are sent out onto the network 10. The Ethernet cable 20 carries signals in accordance with the IEEE 802.3 protocols (10, 100, 1000 Base-T). For data frames or packets exchanged between mobile clients 12 and the network 10, a basic function of the AP 16 is to provide a back-and-forth conversion between the 802.11 and 802.3 protocols; either 802.3 to 802.11 translation downstream and 802.11 to 802.3 translation upstream or 802.11 encapsulation of the 802.3 packets.

As shown in FIG. 2, the network switch 22 has a number of ports 24 for enabling a number of APs 16 and other network devices to connect to the LAN 10. In a large enterprise rollout, a switch 22 can typically have 12-48 ports. In order to route packets between the network 10 and the client devices, the switch 22 includes a switch chip 26. The switch chip 26 is an ASIC (Application-Specific Integrated Circuit). The switch ASIC 26 also cooperates with a central processing unit (CPU) 28, which helps configure the switch ASIC 26. The CPU 28 and the switch ASIC 26 are typically connected over a PCI bus or a MII bus. This allows a memory mapping of the switch chip internal buffers, allowing the CPU access to the buffers when it is required. Similarly, if the switch chip cannot automatically forward a packet, then it will be buffered, allowing the CPU to forward the packet manually. The switch 28 also includes an uplink 30 to connect the switch back to the WAN 10.

In previous-type systems, a typical network switch 22 encounters performance-related problems when used with wireless components. A typical switch ASIC 26 does not have the capability to distinguish between wireless data traffic and any other ordinary network data traffic. An ASIC is a hard-coded "state machine," in which the functions are hard coded and built using AND gates, OR gates, and flip-flops and is fixed directly in the silicon. A typical switch ASIC 26 can only switch packets to the ports 24. But since the AP 16 itself can handle 10-15 clients, network bandwidth can bog down between the AP 16 and the switch 22, since the wireless clients share a single switch port 24, for reasons, which will be explicated below.

One of the principle functions of an Access Point 16 is to receive frames encoded in the 802.11 wireless format and transforms the frames into the 802.3 ethernet format, and visa-versa. Depending on the configuration, the AP will translate the packets from 802.3 to 802.11 downstream (toward the AP), and translate from 802.11 to 802.3 upstream or fully encapsulate the 802.3 packet in an 802.11 packet. Each frame has a header with other into such as a start frame delimiter, a source address, etc., each with a certain number of bits in a certain order defined by the respective IEEE 802 protocol. The middle of each frame includes data, and the end of a frame includes a CRC check (error check). The 802.11 frames are very similar to the 802.3 frames, but include information with specifics of the wireless radio transmission properties. A typical AP includes other functionality, such as security functions for associating new users to the network, and performing filtering so as to limit network access for certain users already associated. It should also be noted that a certain amount of the 802.11 protocol must be done at the 802.11 MAC. This includes inserting the packet sequence numbers for the next packet that the MAC will attempt transmission on. Due to the uncertain nature of packet transmission in the wireless network the 802.11 protocol is robust against packet transmission errors. But because of the 802.11 MAC must manage the ordering of the transmitted packets directly and be able to select the next packet from the various queues (i.e., QoS, Power Save Data).

In a typical LAN, a lot of data traffic is coming up and down the uplink 28 to the switch 22. This traffic includes unicast, multicast and broadcast frames. No problems are encountered with unicast traffic, since packets are intended for a particular recipient, and the switch ASIC 26 directs the packets across the specific intended port 24. However, problems are encountered when sending multicast and broadcast packets, since they are sent to multiple recipients or all recipients. These types of packets go to all the ports 24 of the switch 22. Since such multicast and broadcast traffic is not intended for the wireless clients 12, the AP 16 can get bogged down fending off this traffic.

The typical previous-type switch ASIC also presents other problems. Some types of network traffic have higher bandwidth considerations than other types. For example, in a phone conversation (when using a VoIP 802.11 based phone), a certain amount of data must move more quickly than e.g., web browsing. For this reason, "Quality of Service" (QoS) considerations are established to give higher priority to packets that make up the time bound data traffic. Standards of QoS are specified in the Ethernet and wireless protocols, IEEE 802.3(g) and 802.11(i), respectively.

Another primary difference between a wireless switch and a standard switch is that some wireless clients are in a power save mode. When a wireless client is in a power save mode it cannot immediately accept data. In power save mode, a wireless client can only accept data after it wakes up and responds to the power save poll that occurs as part of the 802.11 Beacon process. This power save function forces the wireless switch to include a store and forward mechanism as part of it's normal operation. Thus, a wireless switch must not only process time bound QoS packets, but also time delayed power save packets. Similar in that both kinds of traffic require their own queue management, but different in the manner in which the queues are managed.

Examples of this power save mechanism are many. One application is where all of the wireless clients are low power handheld computing devices that would always be in power save mode due to limited battery runtime. Another example of a power save wireless client is an 802.11 VoIP phone waiting for a call. The phone would be in power save mode until it "Rang", and was answered.

VLANs help IT managers configure and segment a network. A "virtual LAN" (VLAN) is a group of wireless clients, wired computers, servers, and other network components that function as if they were connected to a single network segment even though they are not. A VLAN enables particular users and resources to be grouped in a logical manner, regardless of the network segment(s) to which they may be physically connected. For example, a VLAN may be used to define a group of visitors to allow wireless internet access but deny access to secure network resources. However, a typical switch ASIC 28 is not capable of distinguishing 802.11 wireless packets for QoS and VLAN purposes.

SUMMARY OF THE INVENTION

The difficulties and drawbacks of the previous-type systems are overcome by the present application-specific integrated circuit and related network switch. The integrated circuit includes switch circuitry for receiving a data frame and forwarding it to a predetermined port. Inspection circuitry is provided for inspecting attributes of the data frame. Decision circuitry is provided for instructing the switch circuitry to forward the data frame based on the attributes.

As will be realized, the invention is capable of other and different embodiments and its several details are capable of modifications in various respects, all without departing from the invention. Accordingly, the drawing and description are to be regarded as illustrative and not restrictive.

DETAILED DESCRIPTION OF THE INVENTION

Figure 1:
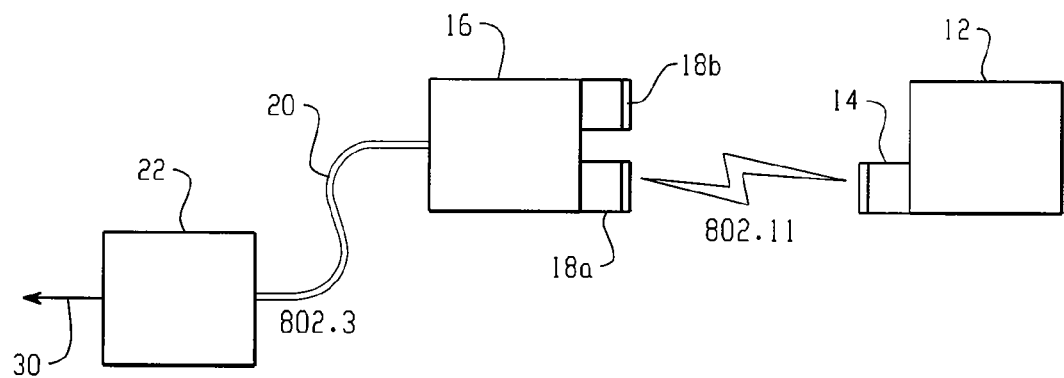
FIG. 1 shows a previous-type wireless LAN.
Figure 2:
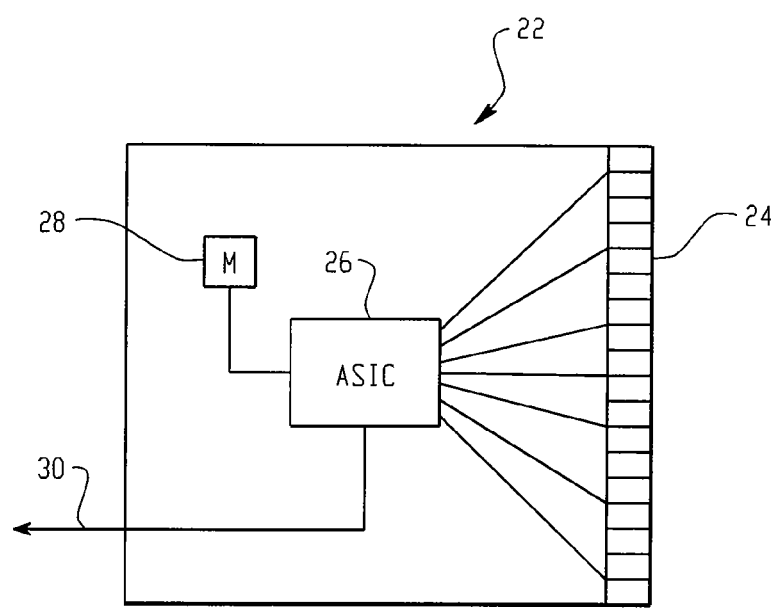
FIG. 2 is a detailed view of the network switch used with a previous type wireless LAN.

As contemplated at present, an application-specific integrated circuit (ASIC) and related network switch is used to help avoid the problems of network traffic getting bogged down at wireless access points. The present ASIC includes switch circuitry for receiving a data frame and forwarding it to a predetermined port. Inspection circuitry is provided for inspecting attributes of the data frame. Decision circuitry is provided for instructing the switch circuitry to forward the data frame based on the attributes.

For example, in one embodiment of the invention, the inspection circuitry can be configured to inspect for wireless attributes. In this embodiment, the decision circuitry would be configured to block non-wireless data frames from wireless ports. In another embodiment of the invention, the inspection circuitry is configured to determine whether a data frame is of higher priority than another data frame, and wherein the decision circuitry is configured to grant precedence in forwarding to the higher priority data frame. In this embodiment, the circuit can include a queue for prioritizing data frames, so as to provide quality of service, and to delay packet transmission for power save clients. In another aspect of the invention, the present circuit can include protocol conversion circuitry for translating the data frame between a first protocol and a second protocol. The first protocol is preferably an Ethernet network protocol, such as established under IEEE 802.3. The second protocol is preferably a wireless protocol, such as established under IEEE 802.11.

The present integrated circuit can be configured to include a memory map for storing and retrieving data frames in a memory according to a data frame's address. A circuitry implementation can be further provided for selectively retrieving data frames based on priority. The memory map can be used to translate data frames between a first protocol and a second protocol. These protocols can respectively be an Ethernet network protocol and a wireless protocol.

With the present ASIC, a memory mapped and serialized core like "PCI Express" would preferably be used instead of a previous-type PCI core, so as to provide a quick, cheap, serial interface into the ASIC. This would require fewer pins on the ASIC, and would be similar to a Reduced MII bus on a wired switch ASIC. A slower MIPS, Power PC, or XScale based processor can be used to run an operating system for the managed switch, that connects to the ASIC via a management bus. The present ASIC would have the functionality of a regular Ethernet switch ASIC, and would preferably also incorporate one or more cores for providing: a PCI interface; a non-blocking switch fabric; packet buffers; L2/L3 ARL tables; CoS Queues; and a Content Addressable Memory (CAM) interface. In addition to these cores, the PCI Express cores would be added to the switch fabric to provide the radio connections. In the preferred embodiment, one or more radio-specific cores would be added for: 802.11 to 802.3 header stripping/encapsulation; Message Integrity Check (MIC) hardware assistance; radio client association tables; transparent bridging; etc.

The primary purpose of using a memory mapped interface is to allow the 802.11 MAC to access the memory mapped buffers and buffer descriptors of the switch while it is transmitting packets. This allows the 802.11 MAC to manage the transmitted buffers without the need to store the packets locally. The packets would remain in the wireless switch until it was transmitted by the AP radio and ACK'ed by the 802.11 client. Current APs are required to store large amounts of packets locally to account for retransmission, power save, QoS, and data traffic for use by the 802.11 radio. Having a high speed link between the 802.11 radio and the wireless switch prevents the need for this extra stage of buffering.

The remote buffering mechanism also has the benefit that as the client roams, or changes the 802.11 radio that it was communicating with, the packet would only need to be requeued by the wireless switch into the queue for the appropriate 802.11 radio. This would allow for higher speed roaming as it would prevent the need for shuffling of packets as wireless clients roamed from AP to AP.

The present switch ASIC could be configured to support traditional VLANs, QoS, Spanning Tree, Multicast Filtering, Packet Aging, etc for both the wired and wireless links. These features would preferably follow standard 802.11 protocols. Additional features that could be incorporated include: support for 802.11 layer 2 transparent bridging; the ability to load balance clients among the different radios; and a power save mode for clients. The present device could be configured to hold packets in power save queues for clients that are in power savings modes. In this way, a network switch in accordance with the present invention extends functionality beyond strictly a switching function, providing instead a "store and forward" type of device for clients in the power save mode. In addition to the present ASIC being inside an Access Point or Bridge with many radios, it could also be used in a configuration where "light" Access Points consisting of a wireless MAC/PHY are connected to a central box via Cat5 cabling running 10/100 Ethernet. The ASIC could be kept back in the central box, so that Ethernet data frames would get converted into a wireless 802.11 format. In this way, the ASIC could work on the packets at a location remote from the AP.

Figure 3:
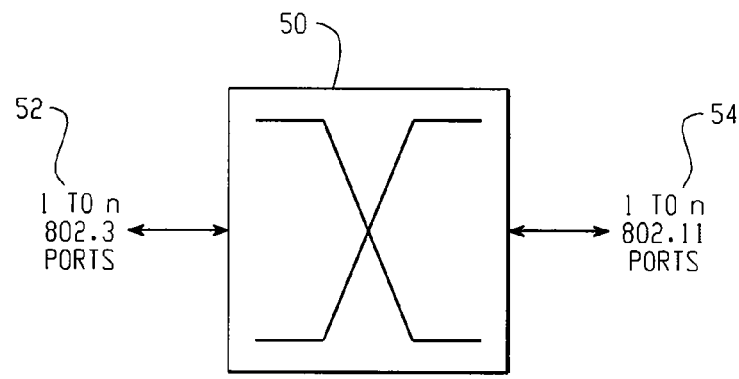
FIG. 3 illustrates an example block diagram providing a general overview of an ASIC.

A general overview of the present ASIC 50 is depicted in FIG. 3, in which 1 to n 802.3 wired ports 52 are provided and 1 to n 802.11 wireless ports 52 are also provided. Each port is not to be construed as strictly defined as being either wired or wireless, and these ports can be regarded as interchangeable between the two types, depending on the type of device plugged into the port. The present wireless switch ASIC ports 52 can operate in several different modes, as are explicated herewith.

In an "802.3 wired port" embodiment, the port 52 functions as a previous-type switch ASIC, in which packets switched in accordance with the IEEE 802.3 Ethernet protocol. The present ASIC 50 includes hardware features that can queue and direct packets so as to provide VLAN functionality, QoS, CoS, and Access Control Lists (ACLs).

In a "wireless-aware 802.3 wired port" embodiment, the port 52 functions in a manner similar to the "802.3 wired port" embodiment. However, when a WLAN Access Point (AP) is connected, the ASIC 50 includes hardware features governing additional protocols to prevent any unnecessary traffic from being sent to the AP that it would normally reject as non-wireless traffic. The AP's Ethernet MAC operates in "promiscuous" mode, and must process every packet and determine whether or not it needs to be forwarded to the WLAN. With the present ASIC, the port 52 is aware of the AP's associated clients, and can prevent any unnecessary traffic from being sent to the AP that could possibly overwhelm it. One example of this would be unicast packet floods. The present wireless switch ASIC 50 includes a forwarding table for each particular port 52. By referencing this forwarding table, the wireless switch ASIC 50 may keep track of which clients are currently associated and disassociated. As clients move around, the MAC addresses can be added/removed from the forwarding table for the particular port 52. When a client roams, the MAC address can be added/removed from the forwarding table for the appropriate port 52.

Figure 4:
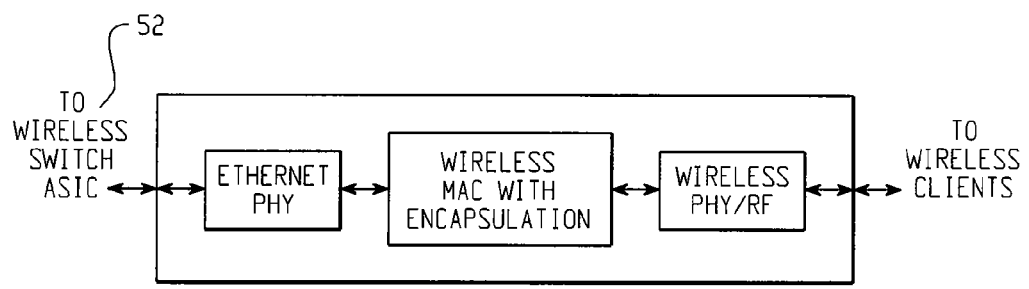
FIG. 4 illustrates an example of a wireless port embodiment.
Figure 5:
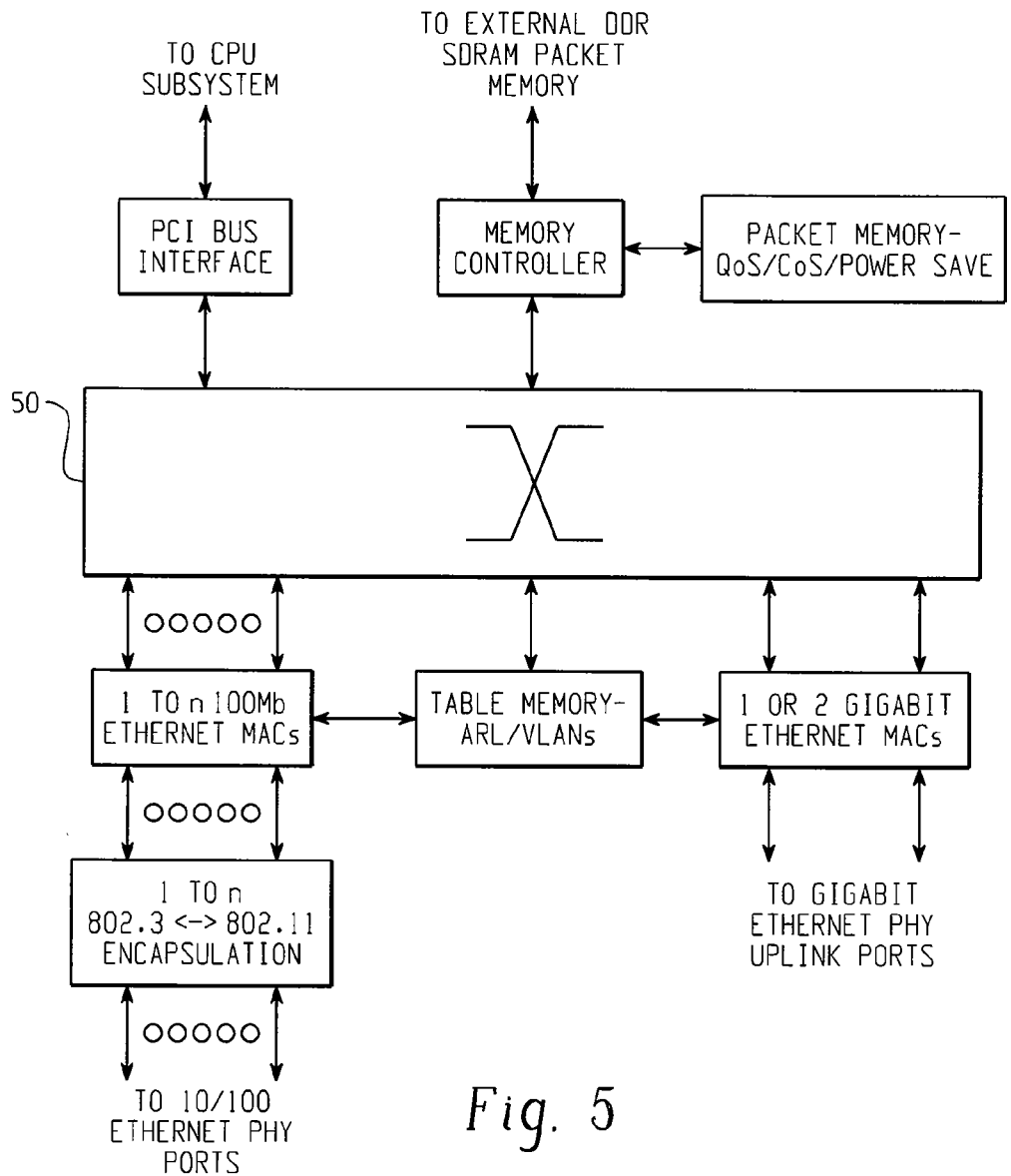
FIG. 5 illustrates an example of a wireless port embodiment.

An "802.11 wireless port" embodiment is shown in FIGS. 4 and 5 and includes the features of the "wireless-aware 802.3 wired port" embodiment. The port 52 receives/sends wireless 802.11 packets that are encapsulated in an 802.3 wrapper. These packets are received/sent from a "light AP" that only consists of an 802.11 radio with an Ethernet PHY. Only a relatively minor amount of processing power is needed to encapsulate/un-encapsulate the 802.11 packet. In this embodiment, the switch ASIC and its governing CPU are "wireless aware" and maintain client association lists, wireless ACLs, wireless CoS, multiple wireless VLANs per port/radio, powersave packet buffering, Message Integrity Check (MIC), Temporal Key Integrity Protocol (TKIP). The CPU/WSA also can also store and distribute any radio firmware updates to the "light APs".

Figure 6:
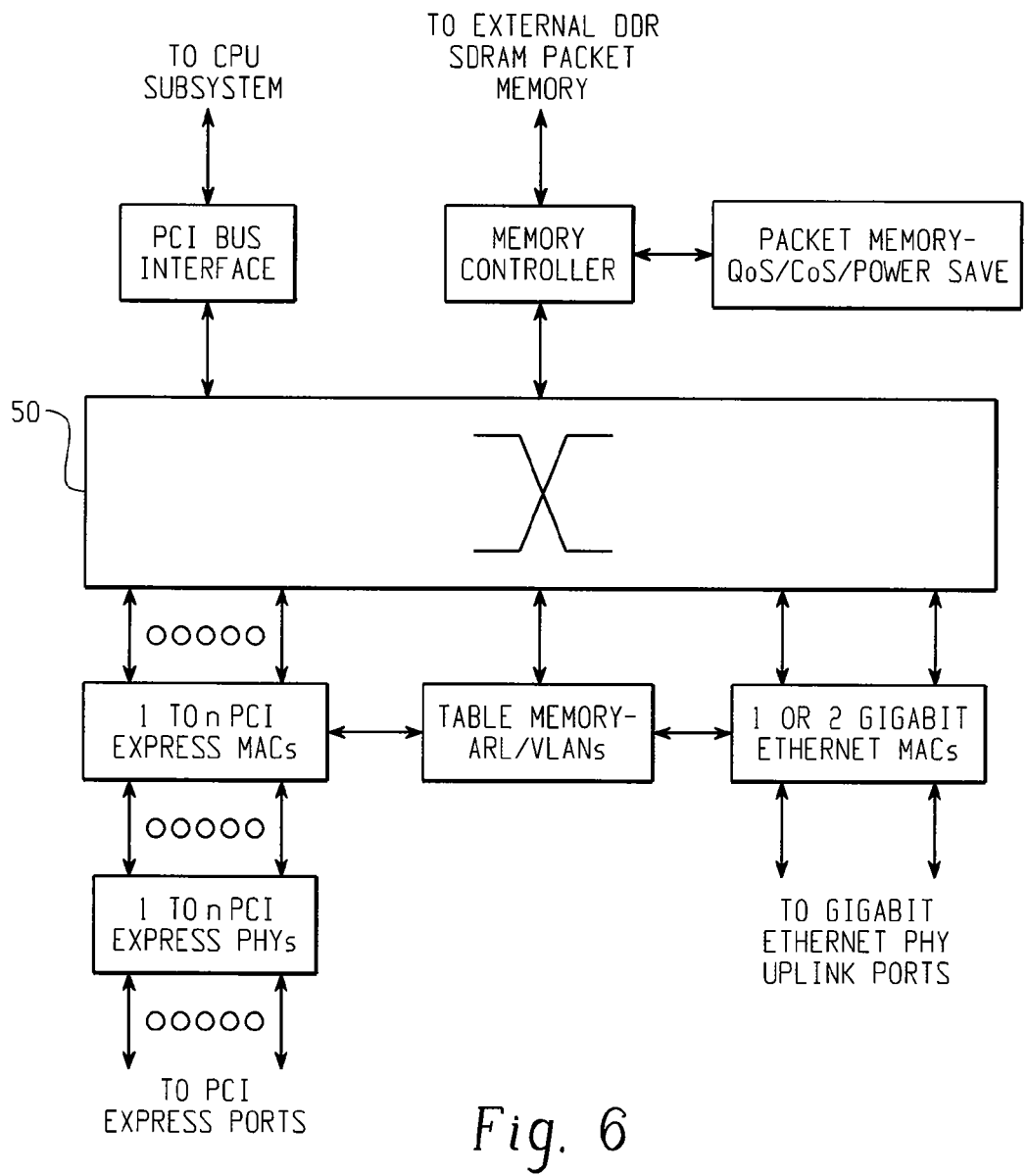
FIG. 6 illustrates an example of a wireless memory mapped port embodiment.

An "802.11 wireless memory mapped port" embodiment is shown in FIG. 6. This embodiment includes the features of the "802.11 wireless port" embodiment, but the functions of the "Light AP" are memory mapped to the switch ASIC 50. This embodiment offers an advantage over the non-memory mapped embodiment in that the "Light AP" is able to request/grab a certain packet within the memory buffers of the wireless switch ASIC 50 to perform CoS/QoS.

As described hereinabove, the present invention solves may problems associated with previous type systems. However, it will be appreciated that various changes in the details, materials and arrangements of parts which have been herein described and illustrated in order to explain the nature of the invention may be made by those skilled in the area within the principle and scope of the invention will be expressed in the appended claims.

We claim:

1. An application-specific integrated circuit (ASIC), comprising:
   switch circuitry for receiving a data frame from a first port and forwarding it to a selected access point on a predetermined port selected from a plurality of access points associated with a plurality of predetermined ports;
   conversion circuitry in communication with the switch circuitry for converting a data frame between a first protocol and a second protocol;
   inspection circuitry for inspecting attributes of the data frame;
   decision circuitry for instructing the switch circuitry to forward the data frame based on the attributes; and
   a memory mapped interface accessible to the plurality of wireless access points in data communication with the switch circuitry;
   wherein the conversion circuitry converts the data frame from a first protocol to a second protocol and the switch circuitry stores the converted data frame in the memory mapped interface in a memory corresponding to the selected access point;
   wherein a data frame is stored in the memory area corresponding to the selected wireless access point for transmitting the packet, the data frame remaining in the memory area until after the data frame is transmitted by the wireless access point and an acknowledgement for the data frame is received by a Media Access Control processor associated with the selected wireless access point.

2. The integrated circuit of claim 1 wherein the inspection circuitry is configured to inspect for wireless attributes and wherein the decision circuitry is configured to block non-wireless data frames from wireless ports.

3. The integrated circuit of claim 1 wherein the inspection circuitry is configured to determine whether a data frame is of higher priority than another data frame, and wherein the decision circuitry is configured to grant precedence in forwarding to the higher priority data frame.

4. The integrated circuit of claim 3 further comprising a queue for prioritizing data frames, so as to provide quality of service.

5. The integrated circuit of claim 1 wherein the first protocol is an Ethernet network protocol and the second protocol is a wireless protocol.

6. The integrated circuit of claim 1 further comprising circuitry for selectively retrieving data frames based on priority.

7. The integrated circuit of claim 1 wherein the first protocol is an Ethernet network protocol and the second protocol as a wireless protocol.

8. A network switch comprising:
   a first port configured to send and receive data frames configured in accordance with a first protocol;
   a plurality of ports for connecting to a plurality of wireless access points, configured to send and receive data frames in accordance with a second protocol;
   a microprocessor-driven application-specific integrated circuit (ASIC) comprising
   switch circuitry for receiving a data frame and forwarding it to a predetermined port;
   inspection circuitry for inspecting attributes of the data frame;

decision circuitry for instructing the switch circuitry to forward the data frame based on the attributes;

a memory mapped interface accessible to a plurality of wireless access points in data communication with the ASIC;

a forwarding table for maintaining a list of media access control addresses of wireless clients associated with the plurality of wireless access points;

a conversion circuit for converting a data frame received on the first port from the first protocol to the second protocol;

wherein the switch circuitry stores packets for the plurality of wireless access points in the memory mapped interface and provides Media Access Control layer processors associated with the plurality of access points with access to the packets;

wherein a packet is stored in a memory area corresponding to a wireless access point for transmitting the packet, the packet remaining in the memory area until after the packet is transmitted by the wireless access point and an acknowledgement for the packet is received by a Media Access Control processor associated with the wireless access point.

9. The network switch of claim 8 wherein the inspection circuitry is configured to inspect for wireless attributes and wherein the decision circuitry is configured to block non-wireless data frames from wireless ports.

10. The network switch of claim 8 wherein the inspection circuitry is configured to determine whether a data frame is of higher priority than another data frame, and wherein the decision circuitry is configured to grant precedence in forwarding to the higher priority data frame.

11. The network switch of claim 10 further comprising a queue for prioritizing data frames, so as to provide quality of service.

12. The network switch of claim 8 wherein the first protocol is an Ethernet network protocol and the second protocol is a wireless protocol.

13. The integrated circuit of claim 1, further comprising one of a group consisting of a core for 802.11 to 802.3 header stripping, a core for 802.11 to 802.3 encapsulation, a core for providing Message Integrity Check (MIC) hardware assistance, and radio client association tables.

14. The integrated circuit of claim 1, wherein the switch circuitry is configured to transfer the data frame from the memory area associated with the selected access point to a second memory area corresponding to a second of the plurality of access points responsive to determining that a wireless client to receive the data frame has roamed from the first access point to the second of the plurality of access points.

15. The integrated circuit of claim 1, further comprising a forwarding table that maintains a list of media access control addresses of wireless clients associated with the plurality of access points associated with the plurality of predetermined ports;

wherein the switch circuitry acquires a media access control destination address in the data frame and determines from the forwarding table the predetermined port.

* * * * *